(No Model.) 2 Sheets—Sheet 1.
EUGEN BARON RITTER & C. KELLNER.
APPARATUS FOR MAKING SOLUTIONS OF BISULPHITES.
No. 328,066. Patented Oct. 13, 1885.
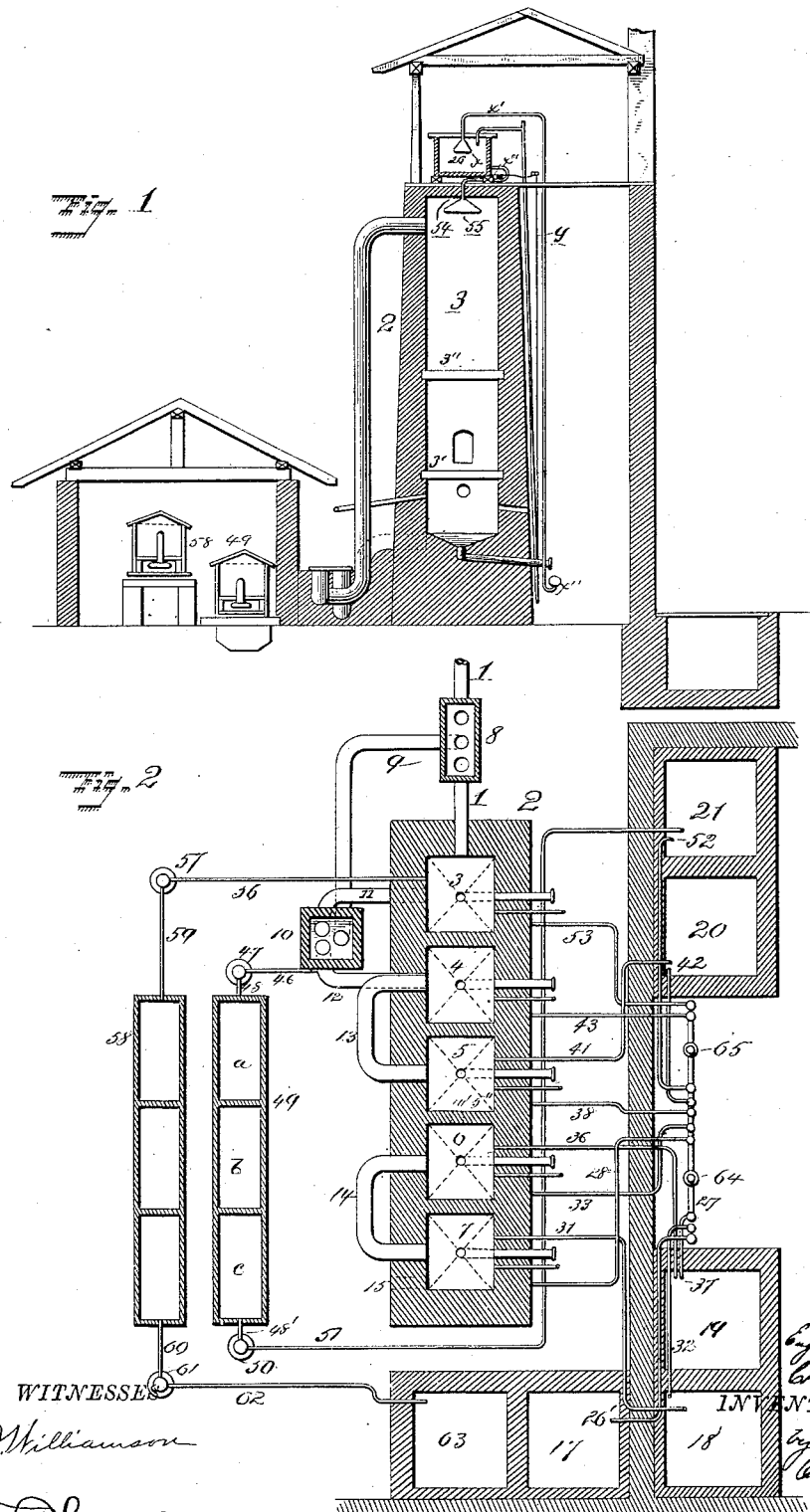

(No Model.) 2 Sheets—Sheet 2.
EUGEN BARON RITTER & C. KELLNER.
APPARATUS FOR MAKING SOLUTIONS OF BISULPHITES.

No. 328,066. Patented Oct. 13, 1885.

WITNESSES
C. J. Williamson.
J. C. Somes.

INVENTOR
Eugen, Baron, Ritter
Charles Kellner
by Connolly Bros
Attorneys

UNITED STATES PATENT OFFICE.

EUGEN BARON RITTER AND CHARLES KELLNER, OF PODGORA, NEAR GOERZ, AUSTRIA-HUNGARY.

APPARATUS FOR MAKING SOLUTIONS OF BISULPHITES.

SPECIFICATION forming part of Letters Patent No. 328,066, dated October 13, 1885.

Application filed January 13, 1885. Serial No. 152,756. (No model.) Patented in Austria-Hungary August 2, 1883, No. 20,024 and No. 31,730; in France September 27, 1883, No. 157,754; in Belgium September 29, 1883, No. 62,746, and in Italy January 22, 1884, No. 16,316.

*To all whom it may concern:*

Be it known that we, EUGEN BARON RITTER and CHARLES KELLNER, subjects of the Emperor of Austria, residing at Podgora, near Goerz, Austria-Hungary, have invented certain new and useful Improvements in Apparatus for Producing Bisulphite Solutions for the Manufacture of Cellulose or Paper-Pulp, (the said invention having been patented to us in Italy January 22, 1884, No. 16,316; France September 27, 1883, No. 157,754; Belgium September 29, 1883, No. 62,746; Austria-Hungary August 2, 1883, No. 20,024 and No. 31,730;) and we do hereby declare the following to be a full, clear, and exact description of the invention, reference being had to the accompanying drawings, which form part of this specification.

This invention has relation to a novel apparatus for the production of polysulphites and double salts—such as bisulphite of magnesium-calcium—intended as a solution for the manufacture of cellulose or paper-pulp, such double-salt solution consisting of sulphurous acid combined with the base in the proportions of more than two atoms of sulphurous acid to one atom of the base.

Our invention consists in the novel construction, combination, and arrangement of parts forming a plant for the production of such double salt according to a certain novel process, for which we have executed an application of even date herewith.

Figure 3:
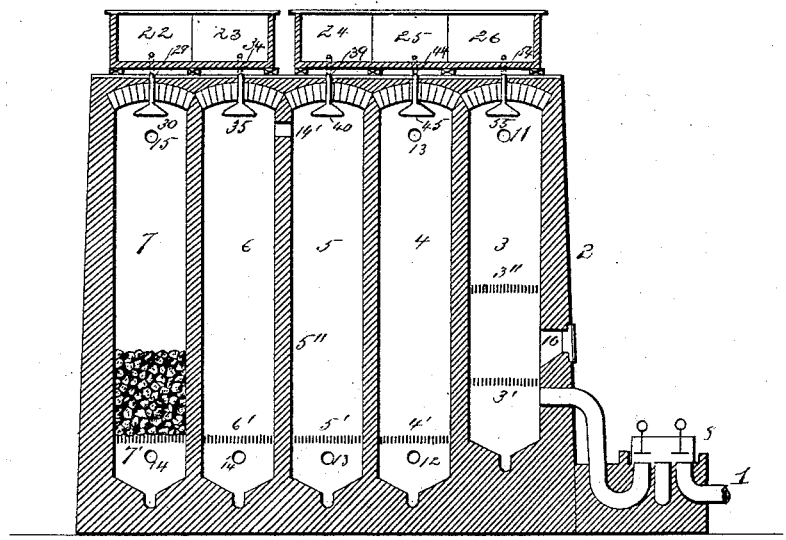
Figure 4:
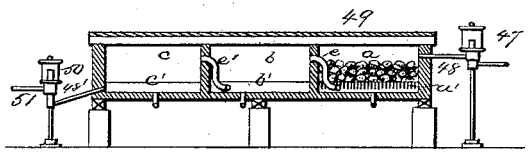

Referring to the accompanying drawings, illustrating the apparatus constituting this invention, Figure 1 is a vertical section; Fig. 2, a horizontal section; Fig. 3, a vertical longitudinal section; Fig. 4, a detail.

1 designates a pipe leading from a generator of sulphur dioxide, (not shown,) and having communication, as hereinafter described, with a chamber, 2, divided into five compartments by walls, so that the gases have to pass a very long way with little velocity, these compartments being designated, respectively, 3 4 5 6 7. Each of these compartments contains near its bottom a grate, 3' 4' 5' 6' 7', respectively, adapted to receive coke, through which the gases pass, the first chamber or compartment having a supplementary grate, 3'', placed some distance above the grate 3', as shown. A sluice-valve, 8, is connected with the pipe 1 before it enters the compartment 3, and said sluice-valve is connected by a pipe, 9, with a second sluice-valve, 10, communicating with the compartment 3 near its top by a pipe, 11, and with the compartment 4 by a pipe, 12, entering said compartment 4 near its bottom. From the top of compartment 4 a pipe, 13, leads downward and sidewise, and communicates with compartment 5 near the bottom thereof. Communication between compartments 5 and 6 is established by an opening in the dividing-wall near the top thereof. A pipe, 14, leads from the bottom of compartment 6 to the bottom of compartment 7, while compartment 7 communicates with the exterior air through a pipe, 15, entering near its top.

The gases passing through pipe 1 have two alternative courses into the absorption-chamber. Thus, after entering the sluice-valve 8, the cold gases can proceed from here either through the pipe 1 directly into the compartment 3 near its bottom, or can (if the lower layer of coke between the two grates is removed and renewed through the opening 16 in order to effect the cleaning) enter through pipe 9 into the sluice-valve 10, and through pipe 12 into the compartment 4. If the gases pass the first way they proceed from compartment 3 by pipe 11 to sluice-valve 10, whence they pass, as before, by pipe 12 to compartment 4. The gases leaving compartment 4 pass through pipe 13 downward and laterally in order to enter compartment 5 near its bottom. Ascending in compartment 5, the gases pass through the communicating opening 14' in the dividing-wall 5', and descend in compartment 6, from which they pass into compartment 7 by pipe 14, said pipe communicating with the bottoms of the compartments 6 and 7. Finally, rising in compartment 7, the gases reach the open air through pipe 15. All the compartments 3 4 5 6 7 are charged with coke fragments or other suitable material, which rests upon the grates 3' 4' 5' 6' 7'.

The liquid takes the opposite course to that of the gases; and we will now proceed to describe the means by which the proper circulation of the liquid is effected.

17 18 19 20 21 designate a series of reservoir-basins, suitably located in the neighborhood of the chambers, and adapted to receive and discharge the liquid in its different conditions. 22, 23, 24, 25, and 26 designate reservoirs or subdivided tanks placed above the compartments 3 4 5 6 7, as shown. From basin 17 a pipe, 26, leads to a main, 27, and from this main a branch pipe, 28, leads to reservoir 22 above compartment 7, and from reservoir 22 a pipe, 29, enters compartment 7 and terminates in a rose, 30. The water contained in the basin 17 is raised to the reservoir 22 through the pipes 26' 27 28, and, escaping from said reservoir through pipe 29 and rose 30, flows into compartment 7, passing over and through the filling material in the opposite direction to that of the gases poorest in sulphurous acid. The compartments 6 and 7 can be charged with lime or dolomite stone instead of coke to insure an absolutely safe absorption or removal of the remainder of the sulphurous acid. From compartment 7 a pipe, 31, leads to the basin 18, and the liquid, after passing through said compartment, escapes through pipe 31 into basin 18. From basin 18 a pipe, 32, communicates with the main 27, and from said main a pipe, 33, leads to reservoir 23, which communicates with compartment 6 by a pipe, 34, and rose 35. From compartment 6 a pipe, 36, leads to basin 19, so as to conduct off the liquid after passing through said compartment. From basin 19 a pipe, 37, leads also to the main 27, from which a pipe, 38, leads to reservoir 24, communicating with compartment 5 by a pipe, 39, and rose 40, and from compartment 5 a pipe, 41, leads to basin 20, for the purpose of conducting off the liquid from said compartment. From basin 20 another pipe, 42, in turn leads to main 27, from which a pipe, 43, runs to reservoir 25, which is in communication with compartment 4 by pipe 44 and rose 45. Compartment 5 communicates through a pipe, 46, with a meter, 47, Fig. 4, from which a pipe, 48, extends to a box, 49, subdivided into compartments $a$ $b$ $c$, containing layers of carbonate deposited in the box in a methodical manner upon suitable gratings, $a'$ $b'$ $c'$. These compartments communicate one with another by pipes $e$ $e'$, leading from below the grating in one box to a point above or on the level with the carbonate in the next, and so on.

The solution of sulphurous acid and water flowing from compartment 4 through the pipe 46 passes into the meter 47, and thence into the box 49, where it traverses the layers of carbonate, the specifically heavier solution of the bisulphite passing through the tubes $e$ $e'$, whereby each quantity of the sulphurous acid is combined with the respective base. 48' designates a pipe leading from the discharge end of the box 49 to a second meter, 50, so constructed as to visibly indicate, by comparison with the indications of meter 47, the course of the process by the difference of concentration. The meter 50 communicates with basin 21 by a pipe, 51, which carries the solution of bisulphite to said basin. A pipe, 52, leads from basin 21 to the main 27, and from main 27 a pipe, 53, runs to reservoir 26, communicating by pipe 54 and rose 55 with compartment 3, so as to convey the solution of bisulphite from basin 21 to said compartment 3. A pipe, 56, runs from compartment 3 to a meter, 57, communicating with a box, 58, by a pipe, 59, and from box 58 a discharge-pipe, 60, leads to a meter, 61, which communicates by a pipe, 62, with a reserve basin, 63. The construction of box 58 is precisely the same as that of box 49, and its purposes are the same.

The raising of the liquid from the basins 17 18 19 20 21 to the reservoirs with which they communicate is effected by two pumps, 64 65, the first pump, 64, lifting and forcing from basins 17 18 19, while the pump 65 draws or sucks from basins 20 and 21 and forces the liquid into the reservoirs. The suction and delivery pipes of the pumps are provided with suitable stop-valves for the purpose of controlling the circulation. The reservoirs 22 23 24 25 26 have each an air-chamber, $x$, which communicates by means of a very small lead tube, $x'$, with a barometer, $x''$, thus indicating the height of the liquid in the respective reservoirs accurately to the centimeter.

The flow of the liquid toward or into the compartments 3 4 5 6 7 through the roses is accurately regulated by compression stopcocks $x'''$ through the medium of drawing-rods $y$ $y$.

Having fully described our invention, we claim—

1. In apparatus for the continuous production of bisulphites by the combination of sulphurous acid with a suitable base, an absorption-chamber communicating with a gas-generator subdivided into a series of communicating compartments, through which the gases are caused to circulate in one direction, in combination with a liquid-supply constructed and adapted to effect a circulation of the liquid through said compartments in an opposite direction to the gases, and a box or boxes containing a base with which the liquid is to unite, for the purpose described.

2. An apparatus for the production of bisulphite by the combination of sulphurous acid with a suitable base, comprising the following elements, viz: an absorption-chamber subdivided into communicating compartments provided with gratings to receive coke or limestone, and connected through suitable pipes and sluice-valves with the gas-supply, a series of liquid-reservoirs surmounting and communicating, respectively, with said compartments, a series of basins with pipes leading to said reservoirs by way of intermediate pumps or delivery devices and with said compartments by means of discharge pipes or conduits, whereby the gases and liquids are caused to circulate through said compartments in opposite directions, boxes adapted to contain carbonates of the base, meters arranged at the entrance and discharge ends of said boxes and
5 communicating therewith, and pipes leading in series from one compartment of the tower to one box, thence to a reservoir-basin next to the last compartment through which the liquid circulates, thence to the second box, and, finally,
10 to the reserve basin, all substantially as described and shown.

In testimony that we claim the foregoing we have hereunto set our hands this 28th day of November, 1884.

EUGEN BARON RITTER.
   CHARLES KELLNER.

Witnesses:
 ÁRPÁD VON BARBER,
 ALBERT VON BARBER.